3,133,860
METHOD OF TREATING ALIMENTARY CANAL ULCERS WITH SAGEBRUSH OIL
Albert Sherman, New York, N.Y., assignor to Planta Laboratories, Inc., New York, N.Y., a corporation of Delaware
No Drawing. Filed July 8, 1960, Ser. No. 41,480
5 Claims. (Cl. 167—55)

This invention relates to a medication employing the essential oil derived from western sagebrush and more specifically to a solid, orally administerable, dry carrier medication useful in the treatment of ulcers of the alimentary canal.

My prior Patent 2,697,060, issued December 14, 1954 establishes that the essential oil derived by steam distillation of the leaves and twigs of the stunted shrubs indigenous to the arid plains and mountains of the Western United States, collectively known as western sagebrush, is an active medicinal in the treatment of the human mucosa or mucous membrane and the skin. Generally, my prior patent provided a composition suitable for the treatment of abnormal conditions of the skin and the mucous membrane, including gingivities; and more specifically provided a composition for the treatment and prevention of inflamed conditions of the gingivae.

This invention is a preferred composition in capsule or pill form which can be taken orally for the internal treatment of ulcers of the alimentary canal, including the stomach, duodenum, ilium, jejunum, large colon, sigmoid colon, rectum and the like.

It is, accordingly, a primary object of this invention to provide an improved medicating method useful in the treatment and cure of ulcers of the alimentary canal from stomach to anus.

It is another object of this invention to provide an improved medicinal composition to be taken orally comprising the artemisian oil distilled, or solvent extracted from western sagebrush.

Other objects and advantages of the invention will in part be obvious and in part appear hereinafter.

This invention, accordingly, is the medicinal composition of the essential oil derived by extraction of the leaves and twigs of the western sagebrush in which the essential oil is absorbed or deposited on a non-toxic carrier, said carrier being kaolin, alumina gel, silica gel, with or without an additional agent to bring about contact of the oil with the stomach, or delayed contact in the intestine. An emulsion of the oil such as described in my United States Patent 2,697,060 may be deposited on the said carrier. The oil phase may consist entirely of the essential oil or may be a solution of the essential oil in one or more of the other water-immiscible liquids. In the case of the oil-in-water type of emulsion, the emulsion may contain a second disperse phase which contains none of this essential oil and it may contain suspended solids.

Generally the emulsion will contain an emulsifying agent or carrier for the essential oil and trace quantities of taste improving components such as flavoring agents like mint, to overcome the objection of some people to the taste of the essential oil, particularly where it is used in a form other than gelatin capsules. When used in pill form, the tablets are given an enteric coating of sugar for improved taste. When the capsule form is used the essential oil should be protected from light in order to prevent it from going rancid and therefore the dry carrier should be an opaque capsule. Essentially the essential oil and non-toxic carrier would be enclosed by an opaque capsule. For the treatment of gastric ulcers a composition of the essential oil, kaolin and egg albumin (dry powdered) in an opaque capsule is used, while for the treatment of duodenal ulcers a composition of the essential oil, kaolin, and Mazola or other vegetable oil in an opaque capsule is desirable. When ulcerations occur in the intestines it is sometimes preferred to have the healing agent formed into tablets with an enteric coating to protect the contents of the tablet until the desired medicating position is reached.

Generally, this invention is a medicinal composition rendering possible the improved medicating method, whereby a sage oil composition in a dry carrier such as capsule, tablet, or suppository form is used internally for the treatment and cure of ulcers of the alimentary canal; said sage oil composition being comprised of two phases in which one of the phases may comprise any non-toxic liquid which is immiscible with the essential oil of the western sagebrush and a second phase may be comprised of entirely the essential oil or it may be a mixture of the essential oil and other liquids immiscible therewith or solids soluble therein, where the essential oil may be emulsified with or without the assistance of an emulsifying agent.

The western sagebrush which forms the source of the essential oil, which is an essential ingredient of my composition, is a closely related group of shrubs indigenous to the Western United States which includes a number of species of the Artemisia genus of the *compositae* family (Linnaeus). Some of these species are *Artemisia tridentata*, *Artemisia ludoviciana*, *Artemisia frigida*, and *Artemisia cana*. Of these species I have worked extensively with the *Artemisia tridentata* which includes the following sub-species:

*Artemisia tridentata typica*
*Artemisia tridentata parishi*
*Artemisia tridentata nova*
*Artemisia tridentata trifida*
*Artemisia tridentata tripartita*
*Artemisia tridentata arbuscula*
*Artemisia tridentata rothrocki*
*Artemisia tridentata spiciformis*
*Artemisia tridentata bolanderi*.

The essential oil is preferably secured from the leaves and twigs threshed from the larger branches of the plants which have been cut in late autumn and allowed to dry thoroughly. The essential oil can be obtained by distillation means and is immiscible with water; however I prefer here (in this invention) to use extraction means whereby a solvent, such as ether, is used to extract the essential oil.

Since the essential oil is immiscible with water, it does not readily come into intimate contact with moist body tissue. However when the essential oil is absorbed in an absorbent such as kaolin the oil will be kept in contact with the mucosa of the ulcerated area, whereby the essential oil has maximum efficiency in the treatment of ulcerations of the stomach, duodenum, intestines, and the like.

The essential oil obtained by extraction of the twigs and leaves of the various species of western sagebrush is a complex mixture of terpenes, unidentified sesquiterpenes, unidentified resins and other unidentified compounds, which varies somewhat with the particular sub-species selected and the particular season of the year in which the plants are harvested. I have been unable to fully establish which of the various constituents of the complex mixture is responsible for its medicinal value in the treatment of ulcers, but am inclined to the belief that its value arises from the cooperative action of several different compounds, including some which are unidentified. In any event, the essential oil is germicidal and astringent in its action and appears to have an analgesic healing effect upon the tissues.

I have found that the essential oil including the artemisal portion is most desirable in this invention for the healing of ulcerations. In order to prevent the loss of the compound designated artemisal, which is part of the healing agent in the treatment of ulcers, a solvent such as ether is used to extract the essential oil including the artemisal portion. A typical essential oil secured from the twigs and leaves of Artemisia tridentata typica by solvent extraction means will consist of approximately 5% artemisal, 20% alpha pinene, 7% cineol, 40% 1-camphor, 12% unidentified sesquiterpenes, and 16% resins.

The Artemisia genus of the compositae family includes a large number of species of plants, in addition to those which fall into the western sagebrush group. Many of these species will yield an essential oil by steam distillation or extraction which is very similar to that obtained from the western sagebrush and for my purposes interchangeable there with. However, the essential oil derived from some of the species contains santonin which is a well known anthelmintic used as a treatment for round worms and other intestinal parasites, but which is highly toxic in large dosages and may also cause certain visual disturbances. Therefore, I prefer not to use an essential oil containing santonin, since its presence would impose severe limitations on the use of my composition. Those species of the Artemisia genus yielding an oil containing santonin and to be avoided are:

A. cina
A. panaflora
A. neo-mexicana
A. wrightii
A. maritima—variety stechnamuiana
A. ramosa
A. sieberi
A. pontica
A. abrotanum Additional species of the Artemisia genus, other than the western sagebrush group yield an essential oil containing toxic compounds and are to be avoided for that reason.

In accordance with the invention the sagebrush oil is absorbed or deposited on a non-toxic carrier, such as kaolin, alumina gel, silica gel, etc., with or without an additional agent to bring about contact of the oil with the stomach, or delayed contact in the intestines. In other words the sagebrush oil which has artemisal as a portion of the healing agent could be used in pure form but without much efficiency since in such form it is immiscible with water and does not readily come into intimate contact with moist body tissue. However, the sage oil with an absorbent such as kaolin keeps the oil in contact with mucosa of the ulcerated area. When gastric ulcers are to be treated powdered egg albumin is used to keep the healing agent in the stomach longer during digestion (of the albumin).

Hereinafter in this specification, the term, "sagebrush oil" will be used for the sake of brevity to designate the non-toxic, water-immiscible, essential oil obtained by extraction, including the artemisal portion, of the twigs and leaves of those species of the Artemisia genus of the compositae family which fall into the group generally recognized as western sagebrush.

One of the phases of the emulsified composition in accordance with the invention may comprise any non-toxic carrier which is immiscible with sagebrush oil. It may be, for example, water, or an aqueous solution of ethylene glycol, glycerine, sorbitol, or mixtures of these liquids and may contain other materials dissolved, suspended or emulsified therein.

The other phase comprises essentially sagebrush oil or it may be a mixture of sagebrush oil and other liquids miscible therewith or solids soluble therein. Thus it may be admixed with another essential oil which acts as a flavor or a perfume.

The sagebrush oil may be emulsified, if desired, without the assistance of an emulsifying agent. I have found that it can be emulsified as the disperse phase in water to form a relatively permanent emulsion by passing it in admixture with water through an emulsifier of the homogenizer type. I have produced an emulsion which appears to be permanently stable using such an emulsifier which exerts a pressure of six hundred pounds per square inch.

I prefer to utilize an emulsifying agent in my composition, since it not only assists in the emulsification of the sagebrush oil, but also causes the emulsion to wet the body tissues more thoroughly and rapidly. The emulsifying agent which I may use in my composition may be any non-toxic compound of the ionic type which have interfacial activity in the production of an emulsion or which is an emulsion stabilizer of the colloidal type. Alternatively, it may be a mixture of one or more of each of these types. Compounds of the ionic type which have interfacial activity and are suitable for my purposes are, for example, ammonium, calcium, magnesium, sodium, potassium salts of alginic or pectic acids. Stabilizing agents of the colloidal type which are suitable include sodium carboxymethylcellulose, water-soluble methyl cellulose, gelatin, pectin, agar-agar, sorbitol and mannitol laurates and stearates, the stearates and laurates, typically edible spans and tweens.

Thus, sagebrush oil, while it may be emulsified with various emulsifying agents as pointed out in my prior patent, is preferably emulsified, distributed, extended or evenly mixed with an inert carrier substance such as a solid non-irritating carrier, for example, kaolin, bentonite, powdered hydrous aluminum or magnesium oxide, hydroxide or silicate, perferably of the absorbtive or gelatinous form.

While, as indicated, the sagebrush oil is distributed as an emulsion wherein it is either the internal or external phase with a liquid other than water, because water softens gelatin. The oil may be converted to a paste or a solid adsorbed in a carrier. However, I prefer as one very useful form, because dosages are most readily controlled, to enclose the liquid or liquid emulsion, as is sometimes preferred, in a gelatin caspule which has the complete masking effect for the taste and which medicates the stomach and alimentary tract.

In another form sometimes preferred, the liquid is adsorbed in a powder carrier, for example, kaolin, hydrous alumina, to form an empirical dry powder. That powder is mixed with a binder slightly moistened, such as starch or sugar, and formed into tablets. The tablet may be given a pleasant tasting coating, or, as is sometimes desired where the medication is intended for release in the gastro-intestinal tract at a point below the stomach, the coating may be enteric coating protective of the contents of the tablet until the proper position in the tract is reached, such enteric coatings being well known in the art. For instance, the coating may be a protein digest releasable by enzymes available at the proper point of the gastronintestinal tract.

The following examples illustrate the practice of this invention.

*Example I*

A capsule comprising a triple A Eli Lilly +6 hard gelatine capsule, each having a capacity of 1.4 cc., is filled with a 10% emulsion of an oil consisting of *Artemisia tridenta typica* which was steam distilled from the leaves of a plant of that species in the usual manner to eliminate artemisal, is emulsified with water, usually mannitol laurate, a commercial span in quantity of about 0.1% of the total emulsification formed by agitation. The liquid filled into said capsules were fed to a patient having a stomach ulcer with a dosage of 4 capsules about an hour before meals. The treatment was continued for three weeks. However, all pain and evidence of the ulcer was gone after the third day.

*Example II*

Another patient was medicated with 4 tablets each containing 0.5 cc. of the same oil species adsorbed in kaolin hydrous alumina, tableted and coated with sugar. The patient had a long history of duodenal ulcer identified by X-ray, with severe pain symptoms for over a year. The medication consisted of 4 tablets about one hour before meals three times daily for a period of about three weeks. In about two days all pain had disappeared, the diet was normal and after three weeks medication was discontinued. No sign of the ulcerated condition has reappeared over a period of about eight months.

In similar fashion treatment was carried out in a total of 24 cases: Same medicinal treatment, mainly in capsule form, resulting in complete healing. Average length of treatment: 2 weeks.

For purposes of treatment of the alimentary canal the oil is deposited in an inert absorbent and administered in conjunction with a good, egg albumin, vegetable oil, or similar product, which will carry it to a preferred area in the alimentary canal.

Thus for gastric ulcers, the oil in an inert carrier with some egg white (powdered) in amount about equal to the kaolin induces a residence time of oil at the site of the ulcers. Any similar colloidal type protein which will hold the oil in the stomach will do.

For duodenal ulcer—the oil with kaolin and a vegetable oil such as Mazola oil brings the material quickly to the duodenum.

As a dry tablet, the oil and kaolin with an enteric coating (such as sugar) with gelatin and plasticizer to delay opening of the coating, will bring the oil deep into the ilium.

What is claimed is:

1. The method of treating ulcerations of the alimentary canal which comprises internally medicating said ulceration directly with an essential oil from a sagebrush plant of the non-toxic species of the genus Artemisia accompanied by a carrier.

2. The method of treating ulcerations of the alimentary canal which comprises internally medicating the ulceration directly with an essential oil from a sagebrush plant of the non-toxic species of the genus Artemisia, said essential oil being in a non-toxic carrier to control its release in the alimentary canal.

3. The method of treating ulcerations of the alimentary canal which comprises internally medicating the ulcerations directly with a water insoluble essential oil distilled from a sagebrush plant of the non-toxic species of the genus Artemisia, said essential oil being adsorbed in a solid adsorptive body to delay its release in the alimentary canal.

4. A method in accordance with claim 3 in which the essential oil is adsorbed in a tablet form powder carrier.

5. The method of treating ulcerations of the alimentary canal which comprises internally medicating said ulcerations directly with a water insoluble essential oil distilled from a sagebrush plant of the non-toxic species of the genus Artemisia, said essential oil being in a suppository form in a carrier.

References Cited in the file of this patent
UNITED STATES PATENTS
2,697,060     Sherman _____ Dec. 14, 1954

OTHER REFERENCES

Hocking: A Dictionary of Terms in Pharmacognosy, Thomas Publisher Inc., 1955, page XVI and pages 18–19.

Steinmetz: Codex Vegetabilis, Amsterdam, Netherlands, 1957, Inserts No. 134 t/M144. (Pages not numbered in this book. This is a three page reference).

Maruzzella: J. Am. Pharm. Assoc., Sci Ed., April 1958, pp. 250–254, vol 47.

Chem. Abst., vol. 49, 1955, page 5786e.